United States Patent [19]

Harada et al.

[11] Patent Number: 5,356,953
[45] Date of Patent: Oct. 18, 1994

[54] RESIN COMPOSITION FOR ARTIFICIAL MARBLE, BULK MOLDING COMPOUND AND SHEET MOLDING COMPOUND USING THE SAME, AND PROCESS FOR PREPARING ARTIFICIAL MARBLE USING THE SAME

[75] Inventors: Koki Harada; Yasuhisa Odagawa, both of Ibaraki, Japan

[73] Assignee: Hitachi Chemical Company Limited, Tokyo, Japan

[21] Appl. No.: 181,206

[22] Filed: Jan. 13, 1994

[30] Foreign Application Priority Data

Jan. 20, 1993 [JP] Japan .................. 5-007476

[51] Int. Cl.$^5$ .......................................... C08L 67/06
[52] U.S. Cl. ................... 523/171; 523/516; 523/523; 523/527; 525/48; 525/170
[58] Field of Search ............... 525/170, 48; 523/171, 523/516, 523, 527

[56] References Cited

U.S. PATENT DOCUMENTS 3,665,055  5/1972  Hatton .................................. 525/170
5,281,633  1/1994  Okuno .................................. 523/171

*Primary Examiner*—Patricia A. Short
*Attorney, Agent, or Firm*—Antonelli, Terry, Stout & Kraus

[57] ABSTRACT

Disclosed are a resin composition for artificial marble comprising:

(I) an unsaturated polyester obtained by using a divalent alcohol containing hydrogenated bisphenol A as an essential component and an $\alpha,\beta$-ethylenic unsaturated dibasic acid;

(II) a copolymerizable monomer;

(III) an unsaturated alcohol which can be copolymerized with the unsaturated polyester (I) and the copolymerizable monomer (II); and (IV) a low molecular weight styrene-maleic anhydride copolymer having a molar ratio of styrene to maleic anhydride being 3:1 to 7:1 and a number average molecular weight of less than 5,000, wherein the unsaturated alcohol (III) is used in such an amount that the weight ratio of the unsaturated alcohol (III) to the copolymerizable monomer (II) is 1:99 to 50:50, the weight ratio of the unsaturated polyester (I) to (the copolymerizable monomer (II)+the unsaturated alcohol (III)) is 30:70 to 70:30, and the weight ratio of the styrene-maleic anhydride copolymer (IV) to (the unsaturated polyester (I)+the copolymerizable monomer (II)+the unsaturated alcohol (III)) is 10:90 to 40:60, a bulk molding compound or sheet molding compound using the same, and a process for preparing artificial marble using the same.

23 Claims, No Drawings

RESIN COMPOSITION FOR ARTIFICIAL MARBLE, BULK MOLDING COMPOUND AND SHEET MOLDING COMPOUND USING THE SAME, AND PROCESS FOR PREPARING ARTIFICIAL MARBLE USING THE SAME

BACKGROUND OF THE INVENTION

This invention relates to a resin composition for artificial marble which can give a marble-like molded product having excellent water resistance, transparency and luster by compression molding under heating in a metal mold, a bulk molding compound or sheet molding compound using the same, and a process for preparing artificial marble using the same.

In the prior art, as a method of obtaining an artificial marble-like molded product, there have been known an injection molding method in which a radical polymerizable thermosetting resin compound is injected in a metal mold at a temperature of room temperature to about 80° C. and a press molding method in which a sheet molding compound or bulk molding compound is subjected to compression molding by using a metal mold having a temperature of 100° to 160° C. at a molding pressure of 3 to 150 kgf/cm$^2$.

In the former method, a molded product having relatively good transparency can be obtained, but there is a drawback that a molding cycle per one molded product is long. In Japanese Patent Publication No. 25928/1990, there has been disclosed a resin composition for injection molding which comprises a side chain-double bonded type polymer obtained by reacting a polymer having a glycidyl group at a side chain with acrylic acid or methacrylic acid, or a side chain-double bonded type polymer obtained by reacting a polymer having an acid anhydride group at a side chain with an unsaturated alcohol having an acryloyl group, a copolymerizable monomer and an inorganic filler. This composition has a low setting temperature of 60° to 80° C. so that it takes a long time to obtain a molded product and when a molded product which requires water resistance (e.g. a bathtub, a washstand and a kitchen counter) is prepared, it is necessary to form a gel-coated resin layer having water resistance.

Further, the side chain-double bonded type polymer used in Japanese Patent Publication No. 25928/1990 has a number average molecular weight of 5,000 or more so that compatibility with an unsaturated polyester resin is poor, whereby phase separation of said polymer is caused to lower characteristics of a molded product obtained.

In the latter method, a molding cycle is short and bulk productivity is excellent, but the compound contains a fiber reinforcing material or a resin such as a saturated polyester resin, polystyrene and polymethyl methacrylate as a low profile additive so that there is a drawback that transparency and stain resistance are poor.

SUMMARY OF THE INVENTION

An object of the present invention is to provide a resin composition for artificial marble which can solve the above problems of the prior art and can give a molded product having excellent water resistance, transparency and luster efficiently by compression molding under heating having a short molding cycle, a bulk molding compound or sheet molding compound using the same, and a process for preparing artificial marble using the same.

The present invention is concerned with a resin composition for artificial marble comprising:

(I) an unsaturated polyester obtained by using a divalent alcohol containing hydrogenated bisphenol A as an essential component and an $\alpha,\beta$-ethylenic unsaturated dibasic acid;

(II) a copolymerizable monomer;

(III) an unsaturated alcohol which can be copolymerized with the unsaturated polyester (I) and the copolymerizable monomer (II); and (IV) a low molecular weight styrene-maleic anhydride copolymer having a molar ratio of styrene to maleic anhydride being 3:1 to 7:1 and a number average molecular weight of less than 5,000, wherein the unsaturated alcohol (III) is used in such an amount that the weight ratio of the unsaturated alcohol (III) to the copolymerizable monomer (II) is 1:99 to 50:50, the weight ratio of the unsaturated polyester (I) to (the sum of the copolymerizable monomer (II)+the unsaturated alcohol (III)) is 30:70 to 70:30, and the weight ratio of the styrene-maleic anhydride copolymer (IV) to (the sum of the unsaturated polyester (I)+the copolymerizable monomer (II)+the unsaturated alcohol (III)) is 10:90 to 40:60, a bulk molding compound or sheet molding compound prepared by thickening the resin composition for artificial marble by aging (heat treatment) at room temperature to 60° C., and a process for preparing artificial marble, which comprises subjecting the bulk molding compound or sheet molding compound to compression molding under heating in a metal mold.

DESCRIPTION OF THE PREFERRED EMBODIMENTS

In the following, the present invention is explained in detail.

The unsaturated polyester (I) to be used in the present invention preferably has a number average molecular weight of 1,000 to 6,000 from the point of characteristics such as operatability and water resistance.

The method of synthesizing the unsaturated polyester (I) is not particularly limited. The unsaturated polyester (I) can be synthesized from a divalent alcohol containing hydrogenated bisphenol A as an essential component and an $\alpha,\beta$-ethylenic unsaturated dibasic acid and, if necessary, a saturated dibasic acid, an alcohol other than hydrogenated bisphenol A or dicyclopentadiene may be used in combination. As an example of the $\alpha,\beta$-ethylenic unsaturated dibasic acid, there may be mentioned maleic acid, fumaric acid, itaconic acid, citraconic acid and anhydrides of these acids. As an example of the saturated dibasic acid to be used in combination, if necessary, there may be mentioned adipic acid, sebacic acid, succinic acid, gluconic acid, phthalic anhydride, o-phthalic acid, isophthalic acid, terephthalic acid and tetrahydrophthalic acid. As an example of the divalent alcohol other than hydrogenated bisphenol A, there may be mentioned an alkanediol, an oxalkanediol and a diol in which ethylene oxide or propylene oxide is added to bisphenol A. In addition to the divalent alcohol, a monovalent or trivalent alcohol may be used. As an example of the alkanediol, there may be mentioned ethylene glycol, 1,2-propylene glycol, 1,3-propylene glycol, 1,3-butanediol, 1,4-butanediol, neopentyl glycol, 1,5-pentadiol, 1,6-hexanediol and cyclohexanediol. As an example of the oxalkanediol, there may be mentioned diethylene glycol and trioxyethylene glycol. As an example of the monovalent or trivalent alcohol which maybe used in combination with these divalent alcohols, there may be mentioned octyl alcohol, oleyl alcohol and trimethylolpropane. These acids or alcohols may be used in combination.

The formulation ratios of the above respective components are as follows:

the molar ratio of the divalent alcohol to the α,β-ethylenic unsaturated dibasic acid is 0.90:1.00 to 1.20:1.00, preferably 1.00:1.00 to 1.10:1.00 from the point of characteristics such as molecular weight and water resistance;

the molar ratio of the saturated dibasic acid to the α,β-ethylenic unsaturated dibasic acid is generally 0:1.00 to 0.70:0.30, preferably 0:1.00 to 0.55:0.45 from the point of characteristics such as water resistance;

the molar ratio of the hydrogenated bisphenol A to the alcohol other than the hydrogenated bisphenol A is generally 0.10:0.90 to 0.50:0.50 from the point of characteristics such as water resistance, preferably 0.20:0.80 to 0.40:0.60 from the point of characteristics such as luster and operatability;

the molar ratio of the α,β-ethylenic unsaturated dibasic acid and the saturated dibasic acid to dicyclopentadiene is less than 1.00:0.05; and the molar ratio of the α,β-ethylenic unsaturated dibasic acid and the saturated dibasic acid to the monovalent or trivalent alcohol is less than 1.00:0.05.

The copolymerizable monomer (II) to be used in the present invention is a polymerizable monomer having at least one ethylenic double bond in the molecule. As an example thereof, there may be mentioned styrene, p-chlorostyrene, vinyltoluene, divinylbenzene and an ester of acrylic acid or methacrylic acid with an alcohol having 1 to 18 carbon atoms (e.g. methyl methacrylate, butyl acrylate and trimethylolpropane trimethacrylate). These monomers may be used in combination of two or more of them.

As an example of the unsaturated alcohol (III) to be used in the present invention, there may be mentioned a hydroxy acrylate such as 2-hydroxyethyl acrylate, 2-hydroxypropyl acrylate and 2-hydroxybutyl acrylate; a hydroxy methacrylate such as 2-hydroxyethyl methacrylate, 2-hydroxypropyl methacrylate and 2-hydroxybutyl methacrylate; an alkyl(hydroxyalkyl) ester of maleic acid such as methyl(2-hydroxyethyl) maleate, ethyl(2-hydroxyethyl) maleate, propyl(2-hydroxyethyl) maleate, butyl(2-hydroxyethyl) maleate, methyl(2-hydroxypropyl) maleate and ethyl(2-hydroxybutyl) maleate; an alkyl(2-hydroxyalkyl) ester of itaconic acid such as methyl(2-hydroxyethyl) itaconate, ethyl(2-hydroxyethyl) itaconate, propyl(2-hydroxyethyl) itaconate, ethyl(2-hydroxypropyl) itaconate and methyl(2-hydroxybutyl) itaconate; an alcohol having an allyl group such as allyl alcohol; an amide such as hydroxymethylacrylamide and hydroxymethylmethacrylamide; and a hydroxyalkylstyrene such as hydroxymethylstyrene and hydroxyethylstyrene. From the points of price and availability, 2-hydroxyethyl methacrylate and 2-hydroxypropyl acrylate are preferred. These unsaturated alcohols may be used in combination of two or more of them.

The styrene-maleic anhydride copolymer (IV) to be used in the present invention has a molar ratio of styrene to maleic anhydride being 3:1 to 7:1 and a number average molecular weight of less than 5,000. The molar ratio of styrene to maleic anhydride is preferably 4:1 to 5:1, and the number average molecular weight is preferably 1,500 to 3,000. If the molar ratio of styrene to maleic anhydride is less than 3:1, compatibility with an unsaturated polyester resin is poor, whereby phase separation of the styrene-maleic anhydride copolymer (IV) is caused to lower characteristics of artificial marble obtained. If the molar ratio exceeds 7:1, transparency of a molded product obtained is lowered. Further, if the number average molecular weight is more than 5,000, compatibilities with the unsaturated polyester (I), the copolymerizable monomer (II) and the unsaturated alcohol (III) are poor, whereby phase separation of the styrene-maleic anhydride copolymer (IV) is caused to lower characteristics of artificial marble obtained. The copolymer (IV) has been already known and is available as, for example, GSM-503 and GSM-505 (trade names) each produced by Gifu Shellac Manufacturing Co., Ltd.

The unsaturated alcohol (III) is used in such an amount that the weight ratio of the unsaturated alcohol (III) to the copolymerizable monomer (II) is 1:99 to 50:50, preferably 1:99 to 15:85. If the amount of the unsaturated alcohol (III) is larger than the weight ratio of the unsaturated alcohol (III) to the copolymerizable monomer (II) of 50:50, water resistance of artificial marble obtained is lowered. If the amount of the unsaturated alcohol (III) is less than the weight ratio of 1:99, the styrene-maleic anhydride copolymer (IV) has poor compatibilities with the unsaturated polyester (I), the copolymerizable monomer (II) and the unsaturated alcohol (III), whereby phase separation of the styrene maleic anhydride copolymer (IV) is caused to lower characteristics of artificial marble obtained.

The weight ratio of the unsaturated polyester (I) to (the copolymerizable monomer (II)+the unsaturated alcohol (III)) is 30:70 to 70:30, preferably 45:55 to 65:35. If the weight ratio is less than 30:70, shrinkage after curing is increased, whereby cracks of artificial marble are formed. If it exceeds 70:30, characteristics of artificial marble obtained are lowered.

The weight ratio of the styrene-maleic anhydride copolymer (IV) to (the unsaturated polyester (I)+the copolymerizable monomer (II)+the unsaturated alcohol (III)) is 10:90 to 40:60, preferably 15:85 to 30:70. If the weight ratio is less than 10:90, cracks of artificial marble are formed, while if it exceeds 40:60, characteristics of artificial marble obtained are lowered. A copolymer containing the above copolymerizable monomer (II) in addition to styrene and maleic anhydride and having a molar ratio of (styrene+the copolymerizable monomer (II)) to maleic anhydride being 3:1 to 7:1 and a number average molecular weight of less than 5,000 may be also used at the same ratio as that of the styrene-maleic anhydride copolymer (IV) if it has good compatibilities with the saturated polyester (I), the copolymerizable monomer (II) and the unsaturated alcohol (III).

A tin compound (V) soluble in the copolymerizable monomer (II), such as dibutyltin diacetate, dibutyltin dilaurate, dibutyltin maleate, dilauryltin diacetate and dioctyltin diacetate may be used as an ester addition catalyst. The amount of the tin compound (V) to be used is preferably 0.1 to 1.0 part by weight based on 100 parts by weight of the resin composition for artificial marble.

Glass powder and/or aluminum hydroxide may be any glass powder and/or aluminum hydroxide generally used for artificial marble, and each amount, particle size and particle size distribution are not particularly limited and are selected depending on characteristics of artificial marble to be obtained.

In the resin composition for artificial marble of the present invention, glass fiber, a polymerization catalyst, a thickener, a releasing agent and a polymerization inhibitor are used and, if necessary, a silane coupling agent, a UV absorber, a pigment, an accelerator and a chain transfer agent are used, all of which are generally used in a bulk molding compound and a sheet molding compound. The amounts of the above additives to be used are not particularly limited and may be amounts generally used.

Further, in the resin composition for artificial marble of the present invention, polystyrene, polymethyl methacrylate, polyvinyl acetate or a copolymer of these may be used in combination, if necessary. From the point of transparency of artificial marble, the weight ratio of the styrene-maleic anhydride copolymer to the above additive is preferably less than 70:30.

A bulk molding compound having good operatability can be obtained generally by adding a polymerization catalyst and, if necessary, the tin compound (V) to the composition containing the unsaturated polyester (I), the copolymerizable monomer (II), the unsaturated alcohol (III) and the styrene-maleic anhydride copolymer (IV), then adding glass powder and/or aluminum hydroxide and the above components such as glass fiber preferably having a length of about 0.5 to 6 mm to the mixture, sufficiently kneading the resulting mixture preferably while carrying out deaeration treatment, and aging the mixture by leaving it to stand under an atmosphere of room temperature to 60° C. for 1 to 5 days to thicken the mixture. This bulk molding compound is subjected to compression molding under heating in a metal mold and set by radical polymerization. The temperature is preferably 100° to 150° C., and the pressure is preferably 20 to 150 kg/cm², whereby artificial marble having excellent water resistance, transparency and luster can be obtained.

A sheet molding compound having good operatability can be obtained generally by adding a polymerization catalyst and, if necessary, the tin compound (V) to the composition containing the unsaturated polyester (I), the copolymerizable monomer (II), the unsaturated alcohol (III) and the styrene-maleic anhydride copolymer (IV), then adding glass powder and/or aluminum hydroxide to the mixture, sufficiently mixing the resulting mixture, impregnating glass fiber preferably having a length of about 25 mm with the mixture, and leaving the impregnated glass fiber to stand under an atmosphere of room temperature to 60° C. for 1 to 5 days. This sheet molding compound is subjected to compression molding under heating in a metal mold and set by radical polymerization. The temperature is preferably 100° to 150° C., and the pressure is preferably about 20 to 150 kg/cm², whereby artificial marble having excellent water resistance, transparency and luster can be obtained.

EXAMPLES

The present invention is described in detail by referring to Examples.

EXAMPLE 1

1,410 g of hydrogenated bisphenol A, 250 g of neopentyl glycol, 370 g of propylene glycol and 1,490 g of isophthalic acid were charged into a 5/four-necked flask equipped with a stirrer, a reflux condenser, a nitrogen gas-introducing tube and a thermometer. The mixture was heated from room temperature to 190° C. over 1 hour and then heated to 215° C. over 5 hours to continue the reaction. When an acid value was 5 mgKOH/g or less, the temperature was lowered to 120° C., and 810 g of neopentyl glycol and 1,070 g of maleic anhydride were charged into the flask. The mixture was heated to 160° C. over 1 hour and then heated to 215° C. over 4 hours to continue the reaction, whereby an unsaturated polyester (A) having an acid value of 22 mgKOH/g was obtained.

A resin composition (B) in which 600 g of the unsaturated polyester (A) was dissolved in 350 g of styrene and 50 g of 2-hydroxyethyl methacrylate, a resin composition (C) in which 600 g of a styrene-maleic anhydride copolymer GSM-505 (trade name, produced by Gifu Shellac Manufacturing Co., Ltd., molar ratio of styrene to maleic anhydride: 5:1, number average molecular weight: 2,500) was dissolved in 400 g of styrene, and dibutyltin dilaurate at a weight ratio of the resin composition (B):the resin composition (C):dibutyltin dilaurate being 60:40:0.5 were sufficiently stirred and mixed to obtain a resin composition (D) for artificial marble.

After components shown in Table 1 were kneaded by using a planetary mixer under a reduced pressure of 260 mmHg, the mixture was left to stand under an atmosphere of 40° C. for 48 hours to obtain a thickened bulk molding compound (E) having good operatability.

By using the bulk molding compound (E) and a flat metal mold (250 mm×500 mm), a molded product (F) with a thickness of 8 mm having excellent transparency and luster was obtained. The linear shrinkage rate of the molded product (F) was 0.3%. The molding conditions were a mold temperature of 130° C., a molding pressure of 100 kg/cm² and a molding time of 10 minutes.

After the molded product (F) was dipped in hot water of 90° C. for 300 hours, appearance was evaluated visually with naked eyes. None of swelling, cracks and remarkable whitening of the molded product (F) were observed. The luster of the molded product (F) was evaluated by measuring 60° angle of illumination according to JIS K 5400, and the result is shown in Table 1.

EXAMPLE 2

A resin composition (G) in which 600 g of the unsaturated polyester (A) obtained in Example 1 was dissolved in 350 g of styrene and 50 g of 2-hydroxyethyl methacrylate, a resin composition (H) in which 600 g of a styrene-maleic anhydride copolymer GSM-503 (trade name, produced by Gifu Shellac Manufacturing Co., Ltd., molar ratio of styrene to maleic anhydride: 3:1, number average molecular weight: 2,500) was dissolved in 400 g of styrene, and dibutyltin dilaurate at a weight ratio of the resin composition (G):the resin composition (H):dibutyltin dilaurate being 60:40:0.5 were sufficiently stirred and mixed to obtain a resin composition (I) for artificial marble.

After components shown in Table 1 were kneaded by using a planetary mixer under a reduced pressure of 260 mmHg, the mixture was left to stand under an atmosphere of 40° C. for 48 hours to obtain a thickened bulk molding compound (J) having good operatability.

By using the bulk molding compound (J) and a flat metal mold (250 mm×500 mm), a molded product (K) with a thickness of 8 mm having excellent transparency and luster was obtained. The linear shrinkage rate of the molded product (K) was 0.3%. The molding conditions were a mold temperature of 130° C., a molding pressure of 100 kg/cm² and a molding time of 10 minutes.

After the molded product (K) was dipped in hot water of 90° C. for 300 hours, appearance was evaluated visually with naked eyes. None of swelling, cracks and remarkable whitening of the molded product (K) were observed. The luster of the molded product (K) was evaluated in the same manner as in Example 1, and the result is shown in Table 1.

COMPARATIVE EXAMPLE 1

362 g of propylene glycol, 990 g of neopentyl glycol and 1,740 g of isophthalic acid were charged into a 5 / four-necked flask equipped with a stirrer, a reflux condenser, a nitrogen gas-introducing tube and a thermometer. The mixture was heated from room temperature to 190° C. over 1 hour and then heated to 215° C. over 5 hours to continue the reaction. When an acid value was 5 mgKOH/g or less, the temperature was lowered to 120° C., and 464 g of propylene glycol and 840 g of maleic anhydride were charged into the flask. The mixture was heated to 160° C. over 1 hour and then heated to 215° C. over 4 hours to continue reaction, whereby an unsaturated polyester (L) having an acid value of 21 mgKOH/g was obtained.

A resin composition (M) in which 600 g of the unsaturated polyester (L) was dissolved in 350 g of styrene and 50 g of 2-hydroxyethyl methacrylate, a resin composition (N) in which 600 g of a styrene-maleic anhydride copolymer GSM-505 (trade name, produced by Gifu Shellac Manufacturing Co., Ltd., molar ratio of styrene to maleic anhydride: 5:1, number average molecular weight: 2,500) was dissolved in 400 g of styrene, and dibutyltin dilaurate at a weight ratio of the resin composition (M):the resin composition (N):dibutyltin dilaurate being 60:40:0.5 were sufficiently stirred and mixed to obtain a resin composition (O) for artificial marble.

After components shown in Table 1 were kneaded by using a planetary mixer under a reduced pressure of 260 mmHg, the mixture was left to stand under an atmosphere of 40° C. for 48 hours to obtain a thickened bulk molding compound (P).

By using the bulk molding compound (P) and a flat metal mold (250 mm × 500 mm), a molded product (Q) with a thickness of 8 mm having excellent transparency, but having no luster was obtained. The molding conditions were a mold temperature of 130° C., a molding pressure of 100 kg/cm² and a molding time of 10 minutes.

After the molded product (Q) was dipped in hot water of 90° C. for 300 hours, appearance was evaluated visually with naked eyes. None of swelling, cracks and remarkable whitening of the molded product (Q) were observed. The luster of the molded product (Q) was evaluated in the same manner as in Example 1, and the result is shown in Table 1.

COMPARATIVE EXAMPLE 2

A resin composition (R) in which 600 g of the unsaturated polyester (L) obtained in Comparative example 1 was dissolved in 350 g of styrene and 50 g of 2-hydroxyethyl methacrylate, a resin composition (S) in which 600 g of a styrene-maleic anhydride copolymer GSM-503 (trade name, produced by Gifu Shellac Manufacturing Co., Ltd., molar ratio of styrene to maleic anhydride: 3:1, number average molecular weight: 2,500) was dissolved in 400 g of styrene, and dibutyltin dilaurate at a weight ratio of the resin composition (R):the resin composition (S):dibutyltin dilaurate being 60:40:0.5 were sufficiently stirred and mixed to obtain a resin composition (T) for artificial marble.

After components shown in Table 1 were kneaded by using a planetary mixer under a reduced pressure of 260 mmHg, the mixture was left to stand under an atmosphere of 40° C. for 48 hours to obtain a thickened bulk molding compound (U).

By using the bulk molding compound (U) and a flat metal mold (250 mm × 500 mm), a molded product (V) with a thickness of 8 mm having excellent transparency, but having no luster was obtained. The molding conditions were a mold temperature of 130° C., a molding pressure of 100 kg/cm² and a molding time of 10 minutes.

After the molded product (V) was dipped in hot water of 90° C. for 300 hours, appearance was evaluated visually with naked eyes. None of swelling, cracks and remarkable whitening of the molded product (V) were observed. The luster of the molded product (V) was evaluated in the same manner as in Example 1, and the result is shown in Table 1.

TABLE 1

|  | Example 1 | Example 2 | Comparative example 1 | Comparative example 2 |
|---|---|---|---|---|
| Resin composition (D)*[1] for artificial marble | 100.0 | — | — | — |
| Resin composition (I)*[2] for artificial marble | — | 100.0 | — | — |
| Resin composition (O)*[3] | — | — | 100.0 | — |
| Resin composition (T)*[4] | — | — | — | 100.0 |
| Hydroquinone | 0.05 | 0.05 | 0.05 | 0.05 |
| Higilite H-320*[5] | 260.0 | 260.0 | 260.0 | 260.0 |
| Zinc stearate | 4.0 | 4.0 | 4.0 | 4.0 |
| Magnesium oxide | 0.6 | 0.6 | 0.6 | 0.6 |
| t-Butyl peroxybenzoate | 1.0 | 1.0 | 1.0 | 1.0 |
| Transparency (visual observation) | Good | Good | Good | Good |
| 60° angle of illumination | 95 | 95 | 85 | 84 |
| Water resistance*[6] | None of swelling, cracks and remarkable | None of swelling, cracks and remarkable | None of swelling, cracks and remarkable | None of swelling, cracks and remarkable |

TABLE 1-continued

|  | Example 1 | Example 2 | Comparative example 1 | Comparative example 2 |
|---|---|---|---|---|
|  | whitening | whitening | whitening | whitening |

(the unit of the values is part by weight)
*1) 2-Hydroxyethyl methacrylate:styrene = 7.5:92.5 (weight ratio)
Unsaturated polyester (A):(styrene + 2-hydroxyethyl methacrylate) = 47.4:52.6 (weight ratio)
GSM-505:(unsaturated polyester (A) + styrene + 2-hydroxyethyl methacrylate) = 24.0:76.0 (weight ratio)
*2) 2-Hydroxyethyl methacrylate:styrene = 7.5:92.5 (weight ratio)
Unsaturated polyester (A):(styrene + 2-hydroxyethyl methacrylate) = 47.4:52.6 (weight ratio)
GSM-503:(unsaturated polyester (A) + styrene + 2-hydroxyethyl methacrylate) = 24.0:76.0 (weight ratio)
*3) 2-Hydroxyethyl methacrylate:styrene = 7.5:92.5 (weight ratio)
Unsaturated polyester (L):(styrene + 2-hydroxyethyl methacrylate) = 47.4:52.6 (weight ratio)
GSM-505:(unsaturated polyester (L) + styrene + 2-hydroxyethyl methacrylate) = 24.0:76.0 (weight ratio)
*4) 2-Hydroxyethyl methacrylate:styrene = 7.5:92.5 (weight ratio)
Unsaturated polyester (L):(styrene + 2-hydroxyethyl methacrylate) = 47.4:52.6 (weight ratio)
GSM-503:(unsaturated polyester (L) + styrene + 2-hydroxyethyl methacrylate) = 24.0:76.0 (weight ratio)
*5) Trade name, produced by Showa Denko Co., aluminum hydroxide
*6) Appearance after continuous dipping in hot water of 90° C. for 300 hours (visual observation with naked eyes)

COMPARATIVE EXAMPLE 3

A styrene-maleic anhydride copolymer GSM-501 (trade name, produced by Gifu Shellac Manufacturing Co., Ltd., molar ratio of styrene to maleic anhydride: 1:1, number average molecular weight: 2,500) was not dissolved in styrene so that a resin composition for artificial marble could not be obtained.

COMPARATIVE EXAMPLE 4

A styrene-maleic anhydride copolymer GSM-502 (trade name, produced by Gifu Shellac Manufacturing Co., Ltd., molar ratio of styrene to maleic anhydride: 2:1, number average molecular weight: 2,500) was not dissolved in styrene so that a resin composition for artificial marble could not be obtained.

COMPARATIVE EXAMPLE 5

The resin composition (G) obtained in Example 2, a resin composition (W) in which 600 g of a styrene-maleic anhydride copolymer GSM-1003 (trade name, produced by Gifu Shellac Manufacturing Co., Ltd., molar ratio of styrene to maleic anhydride: 3:1, number average molecular weight: 8,000) was dissolved in 400 g of styrene and dibutyltin dilaurate at a weight ratio of the resin composition (G):the resin composition (W):dibutyltin dilaurate being 60:40:0.5 were stirred and mixed. However, phase separation was caused to separate GSM-1003 so that a resin composition for artificial marble could not be obtained.

COMPARATIVE EXAMPLE 6

A resin composition (X) in which 600 g of the unsaturated polyester (A) obtained in Example 1 was dissolved in 400 g of styrene, the resin composition (C) obtained in Example 1 and dibutyltin dilaurate at a weight ratio of the resin composition (X):the resin composition (C):dibutyltin dilaurate being 60:40:0.5 were stirred and mixed. However, phase separation was caused to separate GSM-505 so that a resin composition for artificial marble could be not obtained.

COMPARATIVE EXAMPLE 7

The resin composition (X) in which the unsaturated polyester (A) obtained in Example 1 was dissolved in 400 g of styrene, the resin composition (H) obtained in Example 2 and dibutyltin dilaurate at a weight ratio of the resin composition (X):the resin composition (H):dibutyltin dilaurate being 60:40:0.5 were stirred and mixed. However, phase separation was caused to separate GSM-505 so that a resin composition for artificial marble could not be obtained.

COMPARATIVE EXAMPLE 8

A resin composition (Y) in which 600 g of the unsaturated polyester (A) obtained in Example 1 was dissolved in 100 g of styrene and 300 g of 2-hydroxyethyl methacrylate, the resin composition (C) obtained in Example 1 and dibutyltin dilaurate at a weight ratio of the resin composition (Y):the resin composition (C):dibutyltin dilaurate being 60:40:0.5 were sufficiently stirred and mixed to obtain a resin composition (Z). A molded product (AA) was prepared in the same manner as in Comparative example 1 except for using the resin composition (Z) in place of the resin composition (O).

After the molded product (AA) was dipped in hot water of 90° C. for 300 hours, appearance was evaluated visually with naked eyes. Swelling and whitening of the molded product (AA) were observed.

COMPARATIVE EXAMPLE 9

The resin composition (Y) in which 600 g of the unsaturated polyester (A) obtained in Example 1 was dissolved in 100 g of styrene and 300 g of 2-hydroxyethyl methacrylate, the resin composition (H) obtained in Example 2 and dibutyltin dilaurate at a weight ratio of the resin composition (Y):the resin composition (H):dibutyltin dilaurate being 60:40:0.5 were sufficiently stirred and mixed to obtain a resin composition (BB). A molded product (CC) was prepared in the same manner as in Comparative example 1 except for using the resin composition (BB) in place of the resin composition (O).

After the molded product (CC) was dipped in hot water of 90° C. for 300 hours, appearance was evaluated visually with naked eyes. Swelling and whitening of the molded product (CC) were observed.

COMPARATIVE EXAMPLE 10

The resin composition (B) obtained in Example 1, the resin composition (C) obtained in Example 1 and dibutyltin dilaurate at a weight ratio of the resin composition (B):the resin composition (C):dibutyltin dilaurate being 25:75:0.5 were sufficiently stirred and mixed to obtain a resin composition (DD). A molded product (EE) was prepared in the same manner as in Comparative example 1 except for using the resin composition (DD) in place of the resin composition (O).

After the molded product (EE) was dipped in hot water of 90° C. for 300 hours, appearance was evaluated visually with naked eyes. Swelling and whitening of the molded product (EE) were observed.

COMPARATIVE EXAMPLE 11

The resin composition (G) obtained in Example 2, the resin composition (H) obtained in Example 2 and dibutyltin dilaurate at a weight ratio of the resin composition (G):the resin composition (H):dibutyltin dilaurate being 25:75:0.5 were sufficiently stirred and mixed to obtain a resin composition (FF). A molded product (GG) was prepared in the same manner as in Comparative example 1 except for using the resin composition (FF) in place of the resin composition (O).

After the molded product (GG) was dipped in hot water of 90° C. for 300 hours, appearance was evaluated visually with naked eyes. Swelling and whitening of the molded product (GG) were observed.

The resin composition for artificial marble of the present invention can provide artificial marble having excellent water resistance, transparency and luster easily and efficiently by a method of compression molding under heating, and the artificial marble obtained is particularly useful for a washstand, a kitchen counter and a bathtub.

We claim:

1. A resin composition for artificial marble comprising:
   (I) an unsaturated polyester obtained by using a divalent alcohol containing hydrogenated bisphenol A as an essential component and an α,β-ethylenic unsaturated dibasic acid;
   (II) a copolymerizable monomer;
   (III) an unsaturated alcohol which can be copolymerized with the unsaturated polyester (I) and the copolymerizable monomer (II); and
   (IV) a low molecular weight styrene-maleic anhydride copolymer having a molar ratio of styrene to maleic anhydride being 3:1 to 7:1 and a number average molecular weight of less than 5,000,
   wherein the unsaturated alcohol (III) is used in such an amount that the weight ratio of the unsaturated alcohol (III) to the copolymerizable monomer (II) is 1:99 to 50:50, the weight ratio of the unsaturated polyester (I) to (the copolymerizable monomer (II)+the unsaturated alcohol (III)) is 30:70 to 70:30, and the weight ratio of the styrene-maleic anhydride copolymer (IV) to (the unsaturated polyester (I)+the copolymerizable monomer (II)+the unsaturated alcohol (III)) is 10:90 to 40:60.

2. The composition according to claim 1, wherein the unsaturated polyester (I) has a number average molecular weight of 1,000 to 6,000.

3. The composition according to claim 1, wherein the unsaturated polyester (I) is synthesized from the divalent alcohol containing hydrogenated bisphenol A as an essential component and the α,β-ethylenic unsaturated dibasic acid formulated at a molar ratio of 0.90:1.00 to 1.20:1.00.

4. The composition according to claim 1, wherein the copolymerizable monomer (II) is styrene, p-chlorostyrene, vinyltoluene, divinylbenzene or an ester of acrylic acid or methacrylic acid with an alcohol having 1 to 18 carbon atoms.

5. The composition according to claim 1, wherein the unsaturated alcohol (III) is 2-hydroxyethyl methacrylate or 2-hydroxypropyl acrylate.

6. The composition according to claim 1, wherein the styrene-maleic anhydride copolymer (IV) has a molar ratio of styrene to maleic anhydride is 4:1 to 5:1.

7. The composition according to claim 1, wherein the styrene-maleic anhydride copolymer (IV) has a number average molecular weight of 1,500 to 3,000.

8. The composition according to claim 1, wherein the weight ratio of the unsaturated alcohol (III) to the copolymerizable monomer (II) is 1:99 to 15:85.

9. The composition according to claim 1, wherein the weight ratio of the unsaturated polyester (I) to (the copolymerizable monomer (II)+the unsaturated alcohol (III)) is 45:55 to 65:35.

10. The composition according to claim 1, wherein the weight ratio of the styrene-maleic anhydride copolymer (IV) to (the unsaturated polyester (I)+the copolymerizable monomer (II)+the unsaturated alcohol (III)) is 15:85 to 30:70.

11. The composition according to claim 1, wherein the styrene-maleic anhydride copolymer (IV) has a molar ratio of styrene to maleic anhydride is 4:1 to 5:1; the styrene-maleic anhydride copolymer (IV) has a number average molecular weight of 1,500 to 3,000; the weight ratio of the unsaturated alcohol (III) to the copolymerizable monomer (II) is 1:99 to 15:85; the weight ratio of the unsaturated polyester (I) to (the copolymerizable monomer (II)+the unsaturated alcohol (III)) is 45:55 to 65:35; and the weight ratio of the styrene-maleic anhydride copolymer (IV) to (the unsaturated polyester (I)+the copolymerizable monomer (II)+the unsaturated alcohol (III)) is 15:85 to 30:70.

12. The composition according to claim 1, which further comprises a tin compound (V) soluble in the copolymerizable monomer (II).

13. The composition according to claim 12, wherein the tin compound (V) is dibutyltin diacetate, dibutyltin dilaurate, dibutyltin maleate, dilauryltin diacetate or dioctyltin diacetate.

14. The composition according to claim 1, which further comprises at least one of glass powder and aluminum hydroxide.

15. The composition according to claim 14, which further comprises glass fiber, a polymerization catalyst, a thickener, a releasing agent and a polymerization inhibitor.

16. The composition according to claim 15, which further comprises a silane coupling agent, a UV absorber, a pigment, an accelerator and a chain transfer agent.

17. A bulk molding compound or sheet molding compound prepared by thickening the composition according to claim 16 by aging at room temperature to 60° C.

18. A process for preparing artificial marble, which comprises subjecting the bulk molding compound or sheet molding compound according to claim 17 to compression molding under heating in a mold.

19. The composition according to claim 12, which further comprises at least one of glass powder and aluminum hydroxide.

20. The composition according to claim 19, which further comprises glass fiber, a polymerization catalyst, a thickener, a releasing agent and a polymerization inhibitor.

21. The composition according to claim 20, which further comprises a silane coupling agent, a UV absorber, a pigment, an accelerator and a chain transfer agent.

22. A bulk molding compound or sheet molding compound prepared by thickening the composition according to claim 21 by aging at room temperature to 60° C.

23. A process for preparing artificial marble, which comprises subjecting the bulk molding compound or sheet molding compound according to claim 22 to compression molding under heating in a mold.

* * * * *